United States Patent [19]

Wilhelm et al.

[11] Patent Number: 4,741,807

[45] Date of Patent: May 3, 1988

[54] APPARATUS FOR EXTRACTING VALUABLE SUBSTANCES FROM A GRANULAR FEEDSTOCK

[75] Inventors: Joachim Wilhelm, Frankfurt am Main; Rainer Reimert, Idstein; Georg Penk, Bad Vilbel, all of Fed. Rep. of Germany

[73] Assignee: Metallgesellschaft Aktiengesellschaft, Frankfurt am Main, Fed. Rep. of Germany

[21] Appl. No.: 907,542

[22] Filed: Sep. 15, 1986

[30] Foreign Application Priority Data

Sep. 14, 1985 [DE] Fed. Rep. of Germany ....... 3532957

[51] Int. Cl.$^4$ .......................... B01D 11/02; C11B 1/10
[52] U.S. Cl. .................. 196/14.52; 422/145; 422/215; 422/219; 422/223; 422/271; 422/281
[58] Field of Search ............... 422/145, 213, 215, 219, 422/223, 225, 261, 269, 271, 281; 196/14.52; 266/168

[56] References Cited

U.S. PATENT DOCUMENTS

| | | | |
|---|---|---|---|
| 1,474,062 | 11/1923 | Bollmann | 422/269 |
| 2,828,230 | 3/1958 | Heinrich | 422/281 |
| 3,468,633 | 9/1969 | Honchar | 196/14.52 |
| 3,961,022 | 6/1976 | Pierce | 422/281 |
| 4,313,912 | 2/1982 | Barger | 196/14.52 |
| 4,588,476 | 5/1986 | Warzel | 196/14.52 |

FOREIGN PATENT DOCUMENTS 129739 6/1984 European Pat. Off. .

Primary Examiner—David L. Lacey
Attorney, Agent, or Firm—Sprung, Horn, Kramer & Woods

[57] ABSTRACT

In a reactor, granular feedstock having particle sizes in the range from about 0.5 to 15 mm is subjected in a moving bed to a countercurrent extraction at a temperature in the range from 20° to 150° C. and under a pressure in the range from 50 to 400 bars by a continuously supplied solvent which is in a liquid or supercritical state. A mixture of valuable substances and solvent is withdrawn from the upper portion of the reactor. The solvent is separated from the valuable substances by a pressure relief and/or temperature rise and is recycled to the reactor. The extraction residue is withdrawn from the lower end of the reactor. Respective locks are used to charge the feedstock into the reactor and to discharge the extraction residue from the reactor. Solvent and an entrainer are supplied to the reactor at different locations. Outlet ducts having a length of 0.1 to 1 m are preferably used to deliver the feedstock onto a moving bed in the reactor so that a free space is provided over the bed.

5 Claims, 1 Drawing Sheet

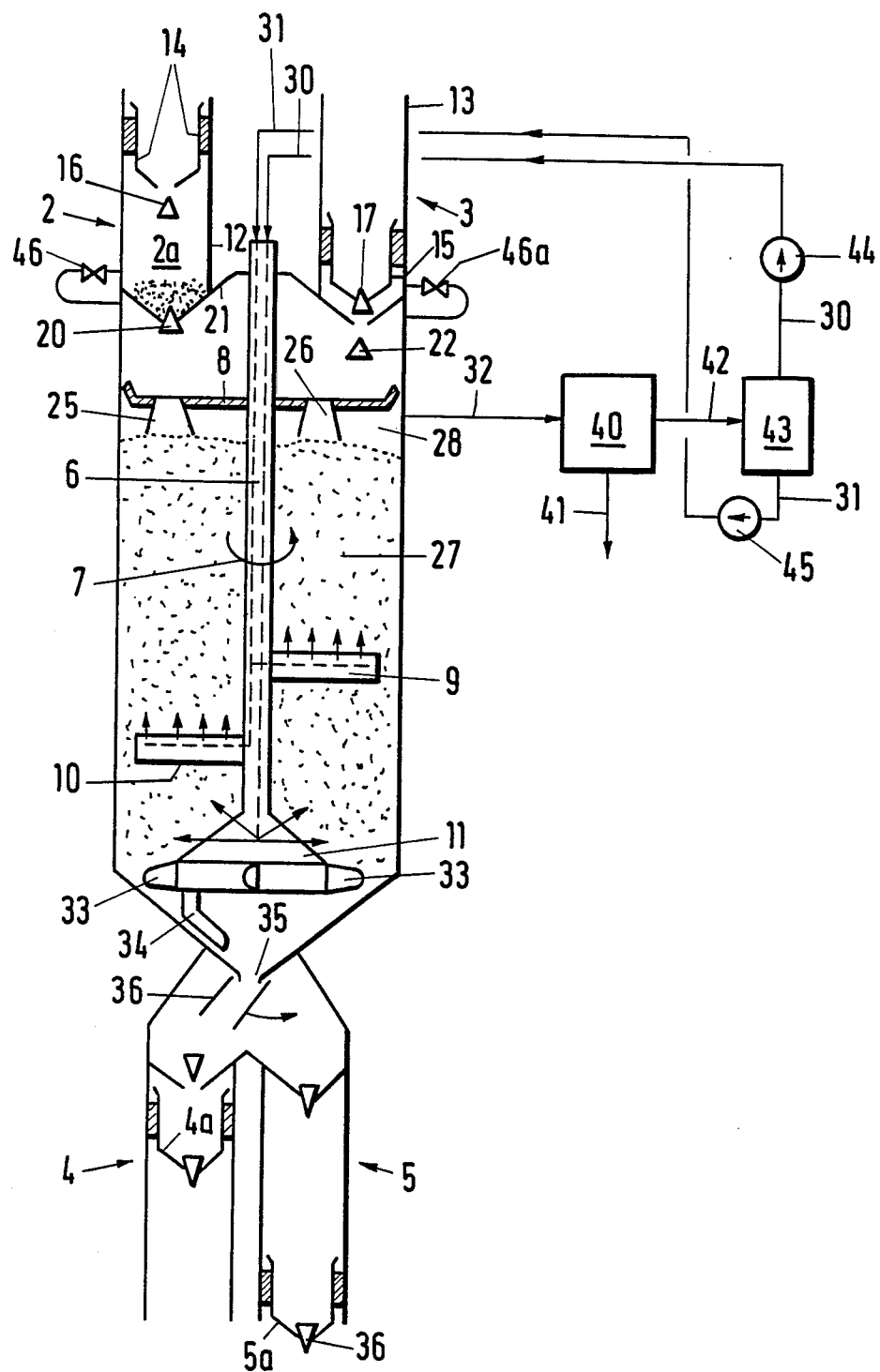

APPARATUS FOR EXTRACTING VALUABLE SUBSTANCES FROM A GRANULAR FEEDSTOCK

BACKGROUND OF THE INVENTION

This invention relates to a process of recovering valuable substances from a granular feedstock having particle sizes in the range from about 0.5 to 15 mm in a moving bed in a reactor by a countercurrent extraction at a temperature in the range from 20° to 150° C. and under a pressure in the range from 50 to 400 bars by a continuously supplied solvent, which is in a liquid or supercritical state, wherein a mixture of valuable substances and solvents is withdrawn from the upper portion of the reactor, the solvent is separated from the valuable substances by a pressure relief and/or temperature rise and is then recycled to the extracting step, and extraction residue is discharged from the lower end of the reactor.

Such a process using a solvent in a supercritical state is known from European Patent Application No. 129 739 and is used to recover fats and oils from oil-containing fruits and oil-containing seeds. The feed-stock is supplied to the extraction reactor by means of a screw extruder and the extraction residue is removed by means of a discharge screw.

SUMMARY OF THE INVENTION

It is an object of the invention to provide a process and a reactor which are suitable for operation at high throughput rates and have a high reliability in operation. This is accomplished in accordance with the invention in that locks are used to charge the feedstock into the reactor and to discharge the extraction residue from the reactor and the solvents and an entrainer are supplied to the reactor at different locations.

The provision of locks affords the advantage that a mechanical stressing of the feedstock is virtually avoided so that the particles will not be crushed. Moreover, the operation of locks is independent of the plastic properties and the flow properties of the solids and the operation of the locks requires only a low energy consumption.

The feedstock is suitably distributed as it is fed to the moving bed in the reactor and a free space is left over the bed. Such free space will mainly be useful if the material being extracted in the reactor tends to swell, i.e., to increase in volume.

The apparatus provided in accordance with the invention for carrying out the process comprises at least one lock which is provided at the upper portion of the reactor and serves to charge the feedstock into the reactor and at least one lock which is provided at the lower portion of the reactor and serves to discharge the extraction residue and the apparatus is provided with inlets for supplying solvent and entraining agent into the extracting portion of the reactor at different locations.

At least individual ones of the locks are desirably provided with an axially movable displacing body, which is axially movable to effect a desired pressurizing and pressure relief of the lock.

In accordance with a further feature of the invention the reactor comprises a rotatable axial tubular shaft, and a distributing disc and stirrer arms, which are secured to said shaft. The tubular shaft and at least individual ones of the stirrer arms are adapted to deliver and distribute solvent or entrainer in the reactor and the tubular shaft is provided at its lower end with outlet openings for solvent.

If the locks for charging feedstock and the locks for discharging extraction residue are equal in number, the rates at which materials are charged and discharged can easily be matched and the surface level of material in the reactor can be maintained substantially constant.

The process and the reactor can be operated at high throughput rates. The extracting portion of the reactor suitably has a volume of 0.5 to 30 m$^3$.

Known solvents and entrainers are used for the extraction. The solvents may consist of carbon dioxide, propane, ethane, ethylene, propylene or mixtures thereof. Entrainers, which increase the solvent power of the solvent, amy consist, e.g., of ethane, propane, butane, alcohols and all $C_1$ to $C_6$ hydrocarbons. In the process in accordance with the invention, only solvent is supplied to the lower part of the extracting portion so that the extraction residue withdrawn below the extracting portion will be free of entrainer.

BRIEF DESCRIPTION OF THE DRAWING

The process and the corresponding reactor will be explained with reference to the drawing, in which the FIGURE is a longitudinal sectional view showing the reactor according to the invention.

DETAILED DESCRIPTION OF THE INVENTION

The reactor 1 is provided with two locks 2, 3 for charging the material to be extracted and with two locks 4,5 for discharging the extraction residue. The reactor is also provided with a tubular shaft 6, which is rotated about its longitudinal axis by drive means not shown in the direction of arrow 7. A horizontal distributing disc 8 and stirrer arms 9, 10 are secured to the tubular shaft 6, which is provided at its lower end with the distributing cone 11.

Each lock 2,3 comprises a stationary guide cylinder 12 or 13 and a displacing pot 14 or 15, which is movable up and down in the cylinder 12 or 13 and is provided with a bottom valve 16 or 17. The lock 2 is under atmospheric pressure. Through the open bottom valve 16, the lock chamber 2a has been partly filled with material to be extracted. The valve 20 provided in the top 21 of the reactor is closed. Before the material to be extracted is introduced into the reactor, the bottom valve 16 of the displacing pot 14 is first closed and the lock chamber is then pressurized in that gas from the reactor 1 is introduced through the valve 46. When the pressure in the lock chamber is approximately the same as in the reactor, the valve 20 or 22 provided in the cover 21 is opened and the contents of the lock chamber are emptied into the reactor, as is shown for the lock 3. When the lock chamber has been emptied into the reactor 1, the displacing pot, which is guided by the cylinder 12 in sealing contact therewith, is lowered by means which are not shown so that the volume of the lock chamber 2a is decreased and the gas consisting mainly of solvent is displaced from the chamber into the reactor 1. Thereafter the valve 20 or 22 in the cover 12 of the reactor is closed and subsequently the displacing pot 14 or 15 is raised to effect a pressure relief of the lock, which can then be refilled from the outside.

From the opened valve 20 or 22 the material to be extracted first falls onto the distributing disc 8, which is secured to and rotates with the tubular shaft 6. The disc 8 is provided with one or more delivery ducts 25, 26, which consist of tubes or wells and depend from the disc in a length of 0.2 to 1 meter. The surface of the moving bed 27 consisting of the material to be extracted is disposed closely below the ducts 25 and 26. Owing to the length of the ducts 25 and 26 there is a free space 28 between the surface of the bed 27 and the underside of the distributing disc. That free space 28 will be particularly desirable if the material swells as it is extracted and then requires spac for expansion.

Solvent is supplied through line 30 and entrainer through line 31. The solvent is conducted in the tubular shaft 6 as far as to the distributing cone 11 and emerges through openings in said cone into the moving bed 27. The introduction of the entrainer and its distribution is performed through the stirrer arms 9, 10. Additional solvent may be introduced into the moving bed 27 through one or more of the stirrer arms 9,10. The extracting portion extends from the distributing cone 11 to the lower rims of the ducts 25, 26. Only solvent is introduced into the lower part of the extracting portion so that the extraction residue, which moves downwardly past the distributing cone 11, is free of entrainer as far as possible.

The product consisting of a mixture of solvent, entrainer and extract is discharged through line 32. By means of finlike plates 33 and of at least one scraper 34 the extraction residue is moved to the outlet 35. When needed, the distributing cone 11 may be provided on the outside with additional projections, fins or plates, which serve to agitate and loosen the material which is being extracted. Such projections may also be provided on the stirrer arms 9 and 10.

From the outlet 35, the extraction residue is supplied on a pivoted chute 36 to one of the two discharge locks 4 and 5, which operate in the manner which has been described hereinbefore for the locks 2 and 3 and just as the latter comprise displacing bodies 4a and 5a, which are movable up and down. The lock 5 has been pressure-relieved by an increase of the volume of its lock chamber and can be emptied when the bottom valve 36 has been opened. When the lock has been emptied, the bottom valve 36 is closed and the associated displacing body 5a is raised to increase the pressure in the lock chamber.

The product conducted in line 32 is processed in known manner so that only brief remarks are required regarding said processing. In the separator 40 the extract is separated from the solvent-entrainer mixture by a pressure relief and/or temperature rise and is withdrawn in line 41. The solvent entrainer mixture is supplied in line 42 to a separator 43, from which solvent is delivered by a compressor 44 in line 30 and entrainer is recycled by another compressor 45 under a sufficiently high pressure through line 31 to the reactor 1.

EXAMPLE

Rape oil having an oil content of about 40% by weight is processed at a rate of 100,000 kg per day by the process which has been explained with reference to the Figure. A pressure of 200 bars and a temperature of about 30° C. are maintained in the extracting portion of the reactor 1. $CO_2$ and ethanol are used as a solvent and entrainer, respectively. The weight ratio of solvent to feedstock is about 10:1 and the weight ratio of entrainer to feedstock is about 1:1. Two locks 2 and 3, which are operated in alternation, are used to charge the rape oil into the reactor 1 and have each guide cylinder 12 or 13 which is 60 cm in diameter and has a height of 2 m. The cycle time of the lock operation is 5 minutes. The extracting portion of the reactor has a volume of 20 $m^3$. The residence time in the extracting portion is 90 minutes. Owing to the provision of the distributing disc 8, the stirrer arms 9 and 10 and the distributing cone 11, the stirrer arms 9 and 10 and the distributing cone 11 the material moves through the reactor uniformly and without a disturbance and is uniformly flown through. The $CO_2$ used as a solvent is in a supercritical state in the reactor and is supplied to the reactor only through the distributing cone 11. The residual oil content in the extraction residue is less than 2% by weight. For the recovery of the rape oil, the product in line 32 is fractionated by a temperature rise to about 100° C. and a succeeding pressure relief. The mixture of $CO_2$ and ethanol is separated by a temperature rise. The solvent and the entrainer are recompressed and are re-used in the reactor 1.

What is claimed is:

1. In an apparatus for recovering valuable substances from a granular feedstock having particle sizes in the range from about 0.5 to 15 mm, having a reactor with a downwardly moving bed of said granular feedstock therein, means for continuously supplying solvent in a liquid or supercritical state to effect a countercurrent extracting to said feedstock in said bed, means for supplying entrainer fluid into said feedstock, means for withdrawing a mixture of valuable substances and solvents from an upper portion of the reactor, means for separating the solvent from the valuable substances by a pressure relief and/or temperature rise and for recycling the solvent to the reactor, and means for discharging extraction residue from a lower end of the reactor, the improvement comprising means for charging feedstock into the reactor comprising at least one charging lock connected to the reactor at its upper portion, wherein the means for discharging the extraction residue comprises at least one discharging lock connected to the reactor at its lower portion and wherein said means for supplying solvent and entrainer are positioned in the lower portion of said bed and are provided at different locations in the lower portion of the reactor, the means for supplying solvent being below the means for supplying entrainer.

2. The apparatus according to claim 1, wherein at least one charging or discharging locks comprises an axially movable displacing body.

3. The apparatus according to claim 1, wherein the reactor includes a rotatable arranged distributing disc, which is disposed over the moving bed and has at least one outlet duct for supplying granular feedstock onto the bed, said at least one outlet duct is directed toward the bed and has a length of 0.2 to 1 m.

4. The apparatus according to claim 3, wherein the reactor has a rotatable arranged axial tubular shaft and stirrer arms, the distributing disc and stirrer arms are secured to said shaft, the tubular shaft and at least one of the stirrer arms define said means for supplying and distribution of solvent and entrainer into the reactor, and the tubular shaft is provided at its lower end with outlets for solvent which defines said supply and distribution means of said tubular shaft.

5. The apparatus according to claim 1, wherein the at least one charging lock and the at least one discharging lock are equal in number.

* * * * *